United States Patent
Tomoda

(10) Patent No.: US 11,487,337 B2
(45) Date of Patent: Nov. 1, 2022

(54) INFORMATION PROCESSING APPARATUS AND METHOD FOR DYNAMICALLY AND AUTONOMOUSLY TUNING A PARAMETER IN A COMPUTER SYSTEM

(71) Applicant: Rakuten Group, Inc., Tokyo (JP)

(72) Inventor: Kyosuke Tomoda, Tokyo (JP)

(73) Assignee: Rakuten Croun Inc., Tokyo (JP)

( * ) Notice: Subject to any disclaimer, the term of this patent is extended or adjusted under 35 U.S.C. 154(b) by 0 days.

(21) Appl. No.: 17/197,345

(22) Filed: Mar. 10, 2021

(65) Prior Publication Data

US 2021/0303044 A1 Sep. 30, 2021

(30) Foreign Application Priority Data

Mar. 27, 2020 (JP) .............................. JP2020-058304

(51) Int. Cl.
*G06F 1/24* (2006.01)
(52) U.S. Cl.
CPC ..................................... *G06F 1/24* (2013.01)
(58) Field of Classification Search
CPC .. G05B 13/042; G05B 13/0265; G06N 20/00; G06N 5/003; G06N 7/005; G06F 1/24
See application file for complete search history.

(56) References Cited

U.S. PATENT DOCUMENTS

| | | | | |
|---|---|---|---|---|
| 2005/0132335 A1* | 6/2005 | Maron | ................ | G06F 11/3476 717/127 |
| 2007/0044082 A1* | 2/2007 | Sauermann | ......... | G06F 11/3612 717/151 |
| 2007/0174838 A1* | 7/2007 | Cotner | ................ | G06F 11/3433 718/100 |
| 2009/0210360 A1* | 8/2009 | Sankar | ................ | G06F 9/44505 706/47 |
| 2009/0293051 A1* | 11/2009 | Krywaniuk | ............. | G06F 8/658 717/173 |
| 2011/0087911 A1* | 4/2011 | Knirsch | ................ | G06F 1/3215 713/324 |
| 2016/0132787 A1* | 5/2016 | Drevo | .................... | G06N 20/10 706/12 |
| 2017/0200091 A1* | 7/2017 | Britton | ................ | G06F 11/3409 |

FOREIGN PATENT DOCUMENTS

JP 2-212966 A 8/1990

* cited by examiner

*Primary Examiner* — Chun Cao
(74) *Attorney, Agent, or Firm* — Sughrue Mion, PLLC

(57) ABSTRACT

Disclosed herein is an information processing apparatus, comprising: a memory configured to store program code; and electric circuitry including a processor, the processor being configured to read and operate according to the program code, the electronic circuitry configured to: set a plurality of candidate values of a parameter tunable in a computer system; trial each of the plurality of set candidate values of the parameter to the computer system for a predetermined period of time or a predetermined number of times and to calculate a reward in the computer system; select, when a trial satisfies a predetermined termination criterion, a candidate value of the parameter for which the maximum reward is calculated among the candidate values of the parameter and apply the selected candidate value of the parameter to the computer system; and re-set candidate values of the parameter based on the selected candidate value of the parameter to repeat.

13 Claims, 7 Drawing Sheets

INFORMATION PROCESSING APPARATUS AND METHOD FOR DYNAMICALLY AND AUTONOMOUSLY TUNING A PARAMETER IN A COMPUTER SYSTEM

TECHNICAL FIELD

The present invention relates to an information processing apparatus and an information processing method, and more particularly, to a technique for dynamically tuning a parameter of a computer system.

BACKGROUND ART

Computer systems are required to keep improved performance and stable operation of the system on a constant basis.

For example, in a computer system that executes a program that times out and terminates when communication is not being performed for a certain period of time, such computer system is required to avoid performance degradation caused by disconnection and reestablishment of communication sessions with client terminals due to the termination of the program time-out. For this reason, communication sessions are maintained by periodically sending health check requests from the client terminal to the computer system.

The Patent Literature 1 (Laid-open Publication of Japanese Patent Application No. Hei-2-212966 A) discloses a host state monitoring method for monitoring the state of a host computer.

More particularly, in the monitoring method of the Patent Literature 1, the host state monitoring process of the workstation transmits a state monitoring command to the host computer, and as a result of the detected state of the host computer, the host state monitoring process receives any of the termination state, during normal operation, the standby state, and the like of the host computer. Subsequently, when the host computer is in normal operation and is not communicating for a certain period of time, the host state monitoring process of the workstation emulates the transmission request from the workstation program to transmit dummy data to the host computer. In this way, it makes it possible to prevent the host computer program from terminating due to a time-out.

PATENT LITERATURE 1: Laid-open Publication of Japanese Patent Application No. Hei 2-212966 A

SUMMARY OF THE INVENTION

Problems to be Solved by the Invention

However, when an excessively large amount of data is sent to the computer system, the communication and processing load for handing the dummy data inevitably increases, and for the worse, the performance of the computer system is likely to be deteriorated and the response time to the normal transmission request from the user client terminal is more likely to be adversely affected. In order to avoid such deterioration of the response time, parameters of the transmission frequency and the transmission amount of the dummy data have to be tuned so as to optimize the performance of the computer system.

In particular, in a computer system of an online transactional type, the number of transactions that the computer system needs to receive and process varies dynamically from time to time depending on the time zone and the day of the week. For this reason, the parameters of the transmission frequency and the transmission amount of the dummy data transaction also need to be tuned at a high frequency, for example, every several hours in accordance with the change in the number of real transactions. Such frequent parameter optimization with manual operation inevitably necessitates excessive time and labor and is therefore extremely difficult.

Recent computer systems are becoming increasingly complex, and the number of parameters to be tuned that contribute to improving the performance of the computer system is becoming enormous.

For example, in a computer system employing the microservices architecture, each service component is independent from one another, therefore parameters to be tuned are highly diversified, such as the number of communications within the system, the number of scalable services, the number of databases, and the like. In addition, the number of tunable parameters provided by a middleware installed in a computer system is also becoming enormous.

As mentioned above, an enormous number of the parameters to be tuned have a wide range of possible parameter values and are interrelated to one another. For this reason, it is becoming increasingly difficult to dynamically tune the interrelated parameters to be tuned while manually verifying the performance one by one.

The present invention has been made in order to solve the above mentioned problems and an object thereof is to provide an information processing apparatus and an information processing method that are capable of dynamically and autonomously tuning a parameter related to the performance of a computer system.

Solution to Problems

In order to solve the above mentioned problems, according to one aspect of the present invention, there is provided an information processing apparatus, comprising: at least one memory configured to store program code; and electric circuitry including at least one of a field programmable gate array (FPGA), an application specific integrated circuit (ASIC), and at least one processor, the at least one processor being configured to read and operate according to the program code, the electronic circuitry configured to: set a plurality of candidate values of a parameter tunable in a computer system; trial each of the plurality of set candidate values of the parameter with respect to the computer system for a predetermined period of time or a predetermined number of times and to calculate a reward in the computer system; select, when a trial satisfies a predetermined termination criterion, a candidate value of the parameter for which the maximum reward is calculated among the candidate values of the parameter and apply the selected candidate value of the parameter with respect to the computer system; and re-set a plurality of candidate values of the parameter based on the selected candidate value of the parameter and repeat processing of setting the parameter, trialing of the parameter, calculating the reward, selecting the candidate value, and applying the parameter with the plurality of re-set candidate values of the parameter.

The electronic circuitry may be further configured to re-set the plurality of candidate values of the parameter so as to include the selected candidate value of the parameter and candidate values of the parameter above and below the selected candidate value of the parameter.

The electronic circuitry may be further configured to repeat the processing of the setting the parameter, the trial of the parameter, the calculating the reward, the selecting the candidate value, and the applying the parameter while the computer system is in operation.

The electronic circuitry may be further configured to re-set the plurality of candidate values of the parameter such that the selected candidate value of the parameter become a center or a vicinity of the center among the plurality of candidate values of the parameter in the subsequent trial.

The electronic circuitry may be further configured to: terminate a trial when the trial is performed for a fixed period of time or a fixed number of times, or when a predetermined reward is accumulated, and select the candidate value of the parameter for which the maximum reward is calculated at an end of the trial and apply the selected candidate value of the parameter to the computer system.

The electronic circuitry may be further configured to dynamically change a width between a plurality of candidate values of the parameter to be re-set and re-set the plurality of candidate values of the parameter.

The electronic circuitry may be further configured to dynamically change the width to be smaller when a rate of a difference in the reward between a plurality of candidate values of the parameter with respect to the width is smaller than the rate in the previous trial, and to be larger when the rate is greater than the rate in the previous trial.

The electronic circuitry may be further configured to tune a first parameter among a plurality of parameters mutually related by repeating the processing of the setting the first parameter, the trial of the first parameter, and the applying the first parameter, subsequently tune a second parameter among the plurality of parameters by repeating the processing of the setting of the second parameter, the trial of the second parameter, the calculating the reward, the selecting the candidate value, and the applying the second parameter, and repeat tuning of the first parameter and the second parameter.

The electronic circuitry may be further configured to set a randomly selected candidate value of the parameter, the randomly selected candidate value being different from the plurality of candidate values of the parameter already set.

The electronic circuitry may be further configured to randomly select a value smaller than any of the plurality of candidate values of the parameter already set.

The electronic circuitry may be further configured to repeat applying the selected candidate value of the parameter to the computer system for a period of time or a number of times that is greater than the predetermined period of time or the predetermined number of times in which each of the plurality of candidate values of the parameter has been trialed.

According to another aspect of the present invention, there is provided an information processing method executed by an information processing apparatus, comprising: setting a plurality of candidate values of a parameter tunable in a computer system; trialing each of the set plurality of candidate values of the parameter with respect to the computer system for a predetermined period of time or a predetermined number of times and calculating a reward in the computer system; selecting, when a trial satisfies a predetermined termination criterion, a candidate value of the parameter for which the maximum reward is calculated among the candidate values of the parameter and applying the selected candidate value of the parameter with respect to the computer system; and re-setting a plurality of candidate values of the parameter based on the selected candidate value of the parameter and repeating processing of the setting of the parameter, the trialing of the parameter, the calculating the reward, the selecting the candidate value, and the applying the parameter with the plurality of re-set candidate values of the parameter.

According to yet another aspect of the present invention, there is provided a non-transitory computer readable medium having stored thereon an information processing computer program for causing a computer to execute information processing, the computer program causing the computer to execute processing comprising: a parameter setting process for setting a plurality of candidate values of a parameter tunable in a computer system; a parameter trial process for trialing each of the plurality of candidate values of the parameter set by the parameter setting process with respect to the computer system for a predetermined period of time or a predetermined number of times and calculating a reward in the computer system; a parameter applying process for selecting, when a trial by the parameter trial process satisfies a predetermined termination criterion, a candidate value of the parameter for which the maximum reward is calculated among the candidate values of the parameter and applying the selected candidate value of the parameter with respect to the computer system; and a controlling process for controlling to cause the parameter setting process to re-set a plurality of candidate values of the parameter based on the candidate value of the parameter selected by the parameter applying process and repeating processing by the parameter setting process, the parameter trial process, and the parameter applying process with the plurality of re-set candidate values of the parameter.

Advantageous Effect of the Invention

According to the present invention, it makes it possible to dynamically and autonomously tune a parameter related to the performance of a computer system.

The above mentioned and other not explicitly mentioned objects, aspects and advantages of the present invention will become apparent to those skilled in the art from the following embodiments (detailed description) of the invention by referring to the accompanying drawings and the appended claims.

DESCRIPTION OF EMBODIMENTS

Figure 1:
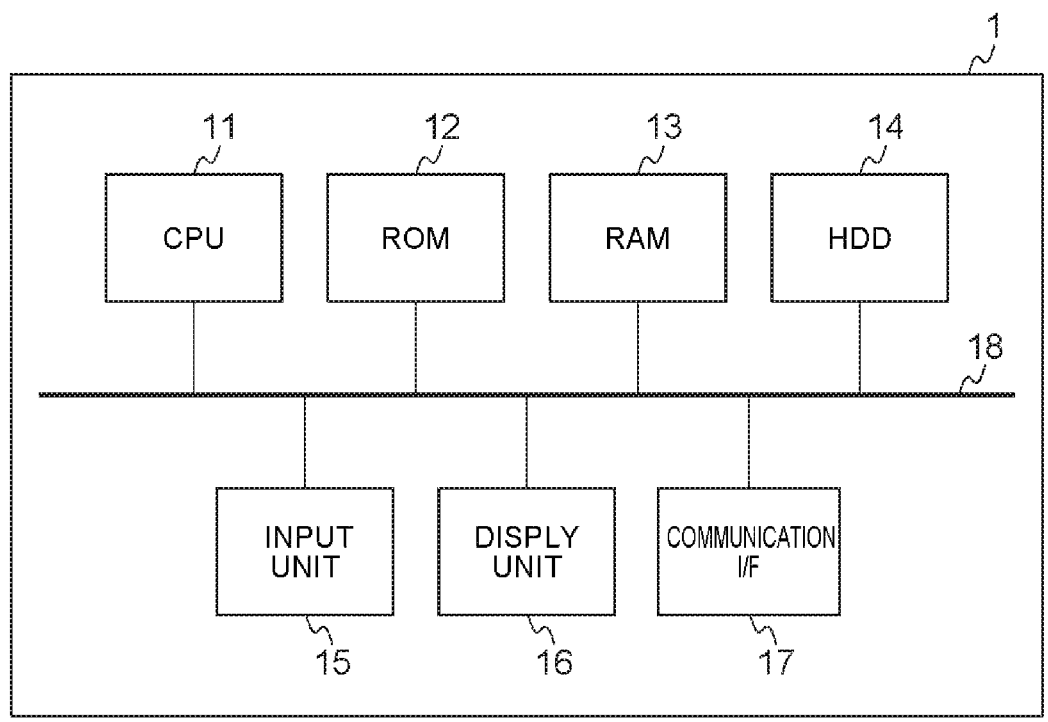
FIG. 1 is a block diagram showing an exemplary hardware configuration of a parameter tuning apparatus according to a present embodiment of the present invention.

Hereinafter, non-limiting embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

First Embodiment

A parameter tuning apparatus according to the present embodiment autonomously and dynamically tunes a parameter related to the performance of a computer system.

Hereinafter, a non-limiting example will be described in which the parameter tuning apparatus tunes (adjusts) the number of dummy requests per unit time by setting, as a parameter, the number of dummy requests to be input to a computer system of an online transaction type and evaluating the response time of the computer system as a reward in order to maintain communication sessions.

Nevertheless, the present embodiment is not limited to the above-mentioned example and is widely applicable to tune any parameters related to the performance of a computer system.

<Hardware Configuration of Parameter Tuning Apparatus>

FIG. 1 is a diagram showing an exemplary hardware configuration of the parameter tuning apparatus 1 according to the present embodiment.

The parameter tuning apparatus 1 according to the present embodiment can be implemented on any one or more computers, mobile devices, or any other processing platform.

As shown in FIG. 1, the parameter tuning apparatus 1 includes a CPU 11, a ROM 12, a RAM 13, an HDD 14, an input unit 15, a display unit 16, a communication I/F 17, and a system bus 18. The parameter tuning apparatus 1 may also incorporate an external memory.

The Central Processing Unit (CPU) 11 controls operations of the parameter tuning apparatus 1 in an integrated manner and controls the respective components (12 to 17) via a system bus 18 serving as a data transmission channel.

The Read Only Memory (ROM) 12 is a non-volatile memory that stores a control program or the like required for CPU 11 to execute the processing. Instead, the program may be stored in the non-volatile memory such as the Hard Disk Drive (HDD) 14, a Solid State Drive (SSD) or the like or in the external memory such as a removable storage medium (not shown).

The Random Access Memory (RAM) 13 is a volatile memory and functions as a main memory or a work area or the like for the CPU 11. In other words, the CPU 11 loads a required program or the like from the ROM 12 into the RAM 13 at the time of executing the processing and executes the program or the like to realize various functional operations.

The HDD 14 stores, for example, various data and various information required when the CPU 11 performs the processing using a program. Furthermore, the HDD 14 stores, for example, various data and various information obtained by the CPU 11 performing the processing using a program or the like.

The input unit 15 is constituted with a keyboard or a pointing device such as a mouse.

The display unit 16 is constituted with a monitor such as a Liquid Crystal Display (LCD). The display unit 16 may provide a Graphical User Interface (GUI) for instructing the parameter tuning apparatus 1 to input various parameters used in the parameter tuning processing, communication parameters used in communication with other devices, and the like.

The communication I/F 17 is an interface for controlling communication between the parameter tuning apparatus 1 and an external device.

Functions of at least some of the elements of the parameter tuning apparatus 1 shown in FIG. 1 can be realized by the CPU 11 executing programs. Nevertheless, at least a part of the functions of the elements of the parameter tuning apparatus 1 shown in FIG. 2, which will be described later, may operate as a dedicated hardware. In this case, the dedicated hardware operates based on the control of the CPU 11.

<Functional Configuration of Parameter Tuning Apparatus>

Figure 2:
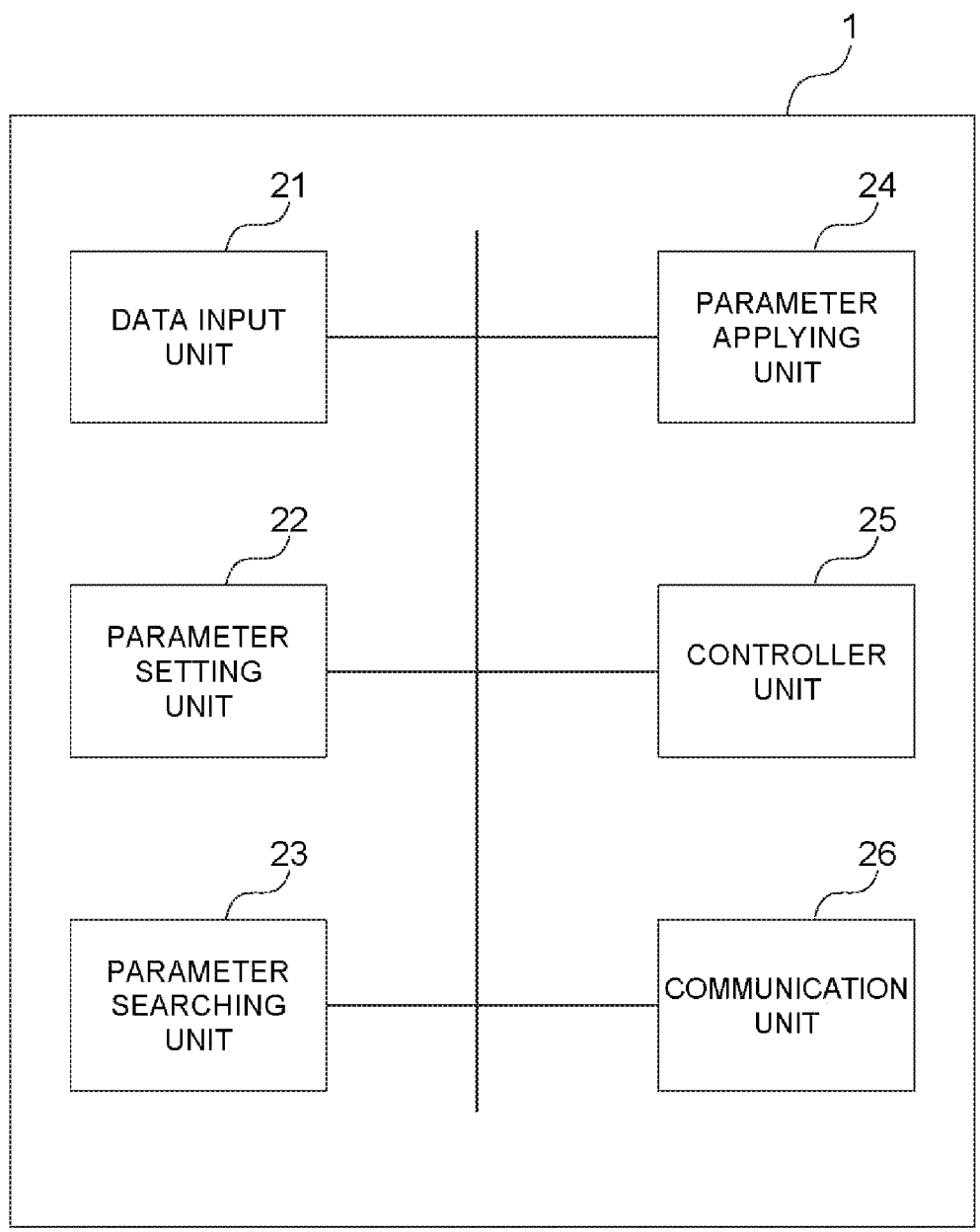
FIG. 2 is a block diagram showing an exemplary functional configuration of the parameter tuning apparatus according to the present embodiment.

FIG. 2 is a block diagram showing an exemplary functional configuration of the parameter tuning apparatus 1 according to the present embodiment.

The parameter tuning apparatus 1 illustrated in FIG. 2 includes a data input unit 21, a parameter setting unit 22, a parameter searching unit 23, a parameter applying unit 24, a controller unit 25, and a communication unit 26.

The data input unit 21 receives an input of a parameter to be tuned in the parameter tuning apparatus 1 and various parameters necessary for performing the tuning of the parameter. The various parameters required to perform parameter tuning include the upper and lower limits of values of each parameter, the increment, the number of options in the trial, the initial value of the selection probability that each option is selected, the termination criterion (or criteria) of the trial (such as the number of trials, the trial time, and the like), the evaluation function for evaluating the parameter, the threshold value of the evaluation, and the like.

The data input unit 21 may store in advance the input various data in a non-volatile storage device such as the HDD 14, and the parameter searching unit 23 and the parameter applying unit 24 may read the various input data stored in the storage device and perform parameter tuning processing using the various input data, which will be described later.

The parameter setting unit 22 forms a population of candidate values of the parameter based on the upper limit, lower limit, and the increment (width) of the values of the parameter to be tuned input to the data input unit 21, and sets, as options, a predetermined number of candidate values of the parameter among the formed population of candidate values of the parameter. Preferably, the parameter setting unit 22 may set a plurality of options including the parameter value currently used in the computer system to which the parameter is applied, from the population of the candidate values of the parameter.

The parameter searching unit 23 searches for an optimal solution from among the predetermined number of the candidate values of the parameter by trialing each option with the predetermined number of the candidate values of the parameter set by the parameter setting unit 22 as options.

More particularly, the parameter searching unit 23 selects each of the plurality of options with a predetermined selection probability, and repeatedly trials the candidate value of the parameter of the selected option a predetermined number of times or for a predetermined period of time. Subsequently, the parameter searching unit 23 calculates a performance index (e.g., response time) of the computer system obtained by the trial of the selected option as a reward using, for example, a predetermined evaluation function, accumulates the rewards of each option until the predetermined termination criterion is reached, and selects, as the optimal solution, the option in which the highest reward is accumulated at the time of reaching the termination criterion.

The parameter applying unit 24 applies the candidate value of the parameter, which is the optimal solution searched by the parameter searching unit 23, to the computer system a predetermined number of times or for a predetermined period of time. A predetermined number of times or a predetermined period of time at which the parameter applying unit 24 applies the candidate value of the parameter, which is an optimal solution, to the computer system may differ from a predetermined number of times or a predetermined period of time at which the parameter searching unit 23 trials the option, and preferably may be greater than a predetermined number of times or a predetermined period of time of the trial. Earlier computer system performance improvements may be realized because more optimal solutions searched in the trial may be applied thereto within a limited tuning period.

The controller unit 25 controls the overall operations of the data input unit 21, the parameter setting unit 22, the parameter searching unit 23, the parameter applying unit 24, and the communication unit 26 in an integrated manner, and causes the parameter tuning apparatus 1 to perform the parameter tuning processing.

According to the present embodiment, after the parameter applying unit 24 applies the candidate value of the parameter, which is the optimal solution, with respect to the computer system a predetermined number of times or for a predetermined period of time, the controller unit 25 causes the parameter setting unit 22 to re-set the predetermined number of the candidate values of the parameter.

More particularly, the controller unit 25 re-sets a predetermined number of candidate values of the parameter to the options such that the candidate value of the parameter, which has been the optimal solution applied by the parameter applying unit 24 to the computer system, do not become the option of the upper limit value or the lower limit value, in other words, the re-set option includes both a larger value and a smaller value than the candidate value of the parameter, which has been the optimal solution. The controller unit 25 causes the parameter searching unit 23 and the parameter applying unit 24 to perform the parameter trial (searching) processing and the applying processing by using the option re-set by the parameter setting unit 22.

The controller unit 25 may also control the display unit 16 to display and output the execution result of the parameter tuning processing executed by the parameter tuning apparatus 1.

The communication unit 26 provides an interface with the network and performs communication with an external device through the network. Through the communication unit 26, parameters to be tuned, various parameters to be used for trial and application of the parameters, and the like are received from external devices, and options of parameters to be tuned, an optimal solution, and the like are transmitted to the computer system to be tuned. According to the present embodiment, the communication unit 26 may perform communication via a wired Local Area Network (LAN) conforming to a communication standard such as Ethernet (registered trademark) or via a dedicated line. Nevertheless, the network that can be used in the present embodiment is not limited to the wired network and may be configured by a wireless network. The wireless networks include wireless Personal Area Network (PAN) such as Bluetooth (registered trademark), ZigBee (registered trademark), and Ultra Wide Band (UWB). It also includes a wireless LAN such as Wi-Fi (Wireless Fidelity) (registered trademark) and a wireless Metropolitan Area Network (MAN) such as WiMAX (registered trademark). In addition, it includes wireless Wide Area Network (WAN) such as LTE/3G, 4G, 5G. It should be noted that the network according to the present embodiment may suffice as long as the network may connect respective devices to each other so as to be able to communicate, and communication standard, scale, and configuration is not limited to the above.

It should be noted that the parameter setting unit 22 corresponds to a parameter setting unit in the claims, the parameter searching unit 23 corresponds to the parameter trial unit in the claims, the parameter applying unit 24 corresponds to the parameter applying unit in the claims, and the controller unit 25 corresponds to the controller unit in the claims.

Hereinafter, an example will be described in which the parameter timing apparatus 1 according to the present embodiment searches for the number of dummy requests for which the response time of the computer system is minimized using the number (frequency) of dummy requests input to the computer system as a parameter to be tuned.

Figure 3:
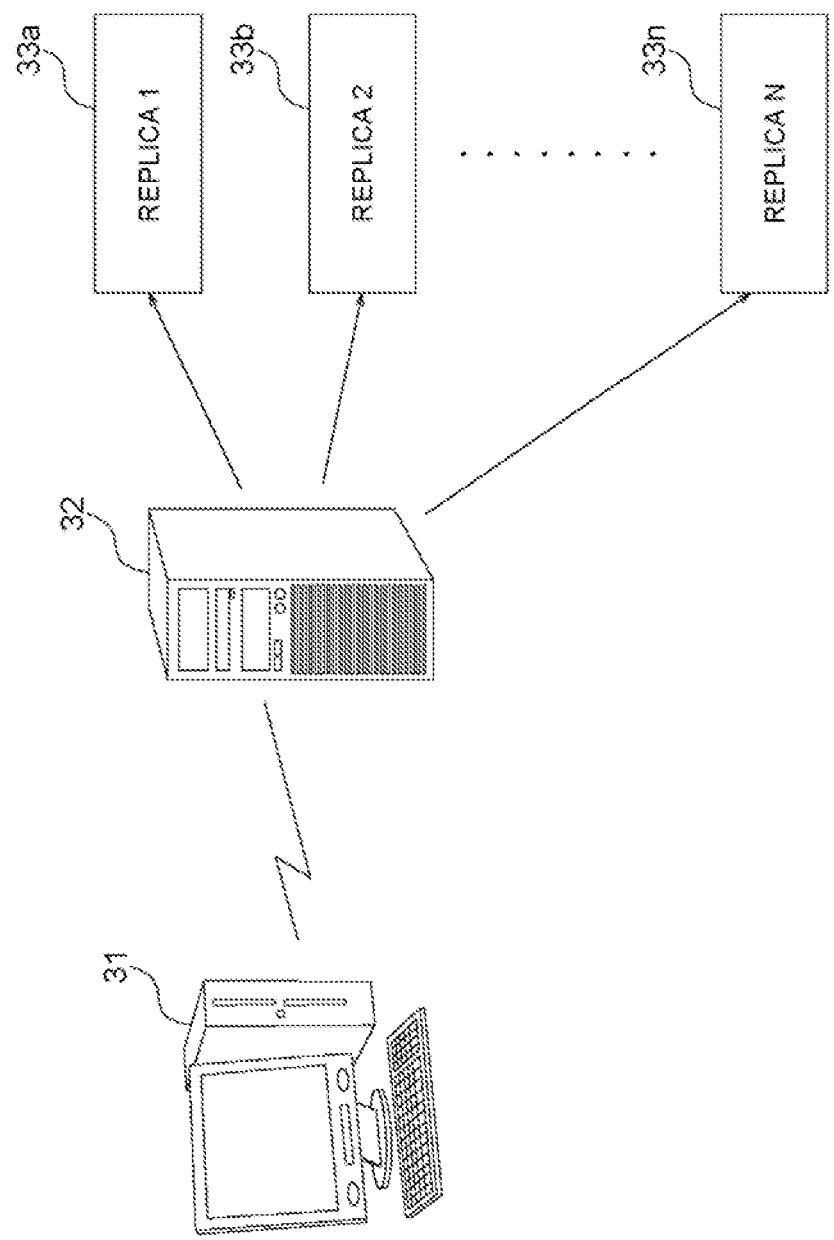
FIG. 3 is a schematic diagram illustrating an exemplary computer system to which the number of dummy requests (i.e., the number of test data transmissions) to be tuned by the parameter tuning apparatus according to the present embodiment is input.

FIG. 3 is a schematic diagram showing an exemplary computer system to which the number of dummy requests (the number of test data transmissions) to be tuned by the parameter tuning apparatus 1 according to the present embodiment is input.

Referring to FIG. 3, the computer system includes a client terminal 31, a load balancer 32, and a plurality of replica servers 33a, 33b, . . . , 33n. The number of replica servers 33a, 33b, . . . 33n may be fixed or variable. In addition, a single server may be provided instead of the replica servers 33a, 33b, . . . , 33n.

From the client terminal 31, for example, 100 times each, requests are sent to the respective replica servers 33a, 33b, and 33c that correspond to the plurality of options of the dummy request numbers (x, x−1, x+1 QPS (Query per Second)) through the load balancer 32, respectively, and the response times t1, t2, and t3 from the respective replica servers 33a, 33b, and 33c are then measured, respectively. Since requests for real transactions are transmitted as well to the replica servers 33a, 33b, . . . , 33n shown in FIG. 3 through the load balancer 32, the QPSx at which the response time is minimized varies from time to time.

It should be noted that, according to the present embodiment, the computer system to which the parameter is to be applied is not limited to the configuration shown in FIG. 3, and may have another network configuration, or may be realized by a single computer.

According to the present embodiment, the parameter searching unit 23 and the parameter applying unit 24 of the parameter tuning apparatus 1 search for an unknown optimal solution by using the Bandit algorithm.

The Bandit algorithm is an unsupervised machine learning method, which is also referred to as a reinforcement learning. The Bandit algorithm is an algorithm that maximizes a reward for a certain period (number of times or period of time) by performing the exploration that calculates the reward and searches for the optimal solution for all the options (hereinafter, also referred to as "arms") while concurrently performing the exploitation that exploits the searched optimal solution large number of times to increase the reward.

According to the present embodiment, the Banded algorithm is used to autonomously and dynamically tune (adjust) a parameter so as to follow changes in the number of real transactions from among a large number of candidate values of the parameter.

More particularly, the parameter tuning apparatus 1 according to the present embodiment sets a plurality of options (arms), for example, {x−α, x, x+α}, from among a number of candidate values of a parameter, trials each arm for a predetermined time T or a predetermined number of times N, and measures a target performance index (response time or the like) during that time, which is referred to as a single trial.

The parameter tuning apparatus 1 performs such single trial a plurality of times, and by using the Bandit algorithm (multi-arm Bandit algorithm), the parameter tuning apparatus 1 finds an optimal parameter as early as possible while reducing the choice of a parameter deteriorating the performance.

<Processing Procedure of Parameter Tuning Processing>

Figure 4:
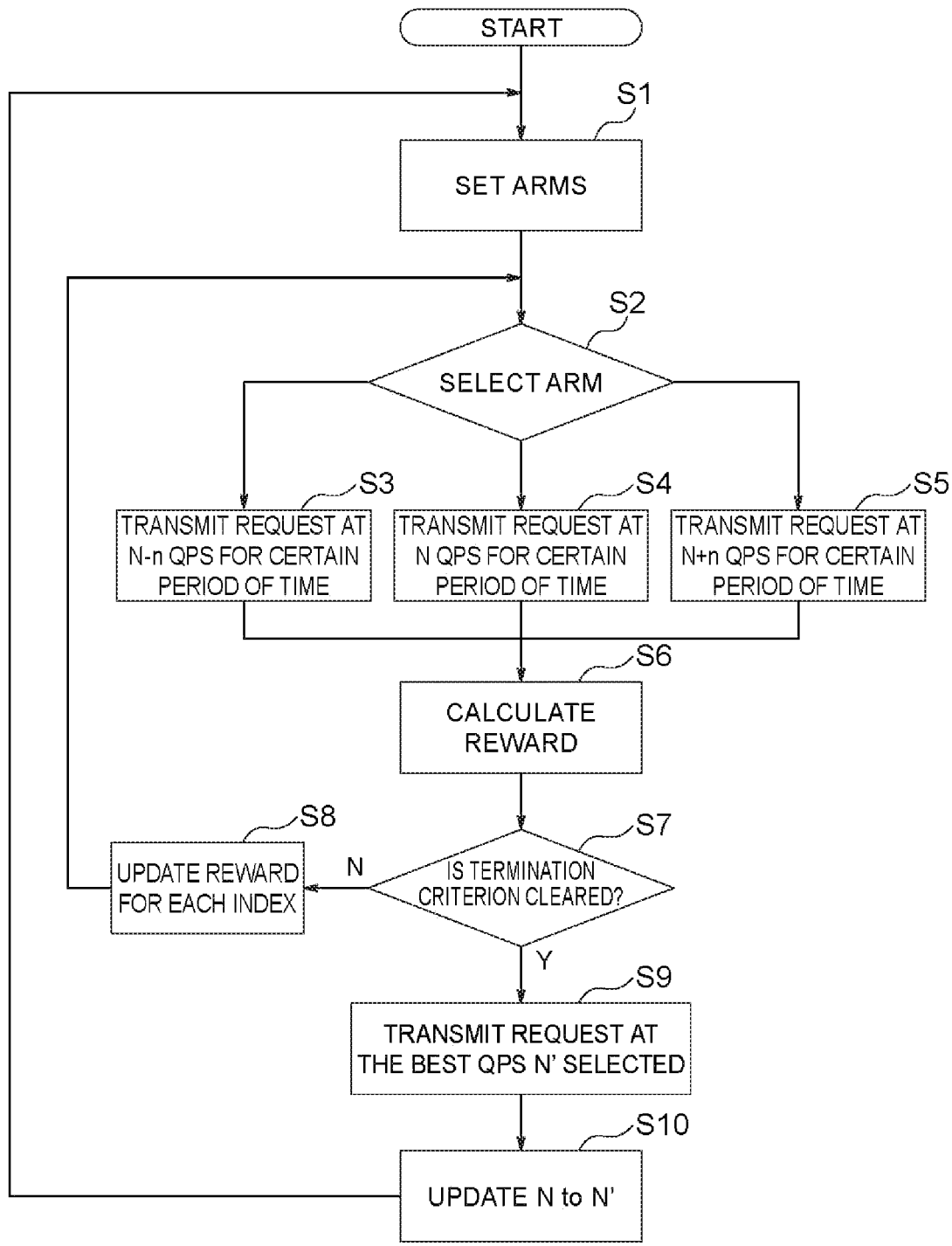
FIG. 4 is a flowchart showing an exemplary processing procedure of a parameter tuning processing performed by the parameter tuning apparatus according to a first embodiment.

FIG. 4 is a flowchart illustrating an exemplary processing procedure of a parameter tuning processing performed by the parameter tuning apparatus 1 according to the present embodiment.

It should be noted that each step shown in FIG. 4 may be performed by the CPU 11 reading and executing a program stored in the storage device such as the HDD 14 of the parameter tuning apparatus 1. Alternatively, at least apart of the flowchart shown in FIG. 4 may be implemented by a hardware. When implemented by the hardware, for example, by using a predetermined compiler, a dedicated circuit may be automatically generated on a Field Programmable Gate Array (FPGA) from programs for implementing the respective steps. Furthermore, a gate array circuitry may be formed in the same manner as the FPGA and implemented as the hardware. Yet furthermore, it may be implemented by an Application Specific Integrated Circuit (ASIC).

In step S1, the parameter setting unit 22 of the parameter tuning apparatus 1 forms a population of candidate values that the parameter to be tuned may have based on the upper and lower limits and the increment (width) of the value of the parameter to be tuned, which are input to the data input unit 21. The parameter setting unit 22 sets, as arms, a predetermined number of candidate values of the parameter from among the formed population of candidate values of the parameter. Each arm serves as an option to be trialed by the Bandit algorithm. In the flowchart of FIG. 4, three arms are set, as shown in steps S3 to S5. Nevertheless, the number of arms is not limited to three and may be two, or four or more.

In step S2, the parameter searching unit 23 of the parameter tuning apparatus 1 selects one arm to be trialed this time from among the plurality of arms set by the parameter setting unit 22 in step S1. In FIG. 4, the parameter searching unit 23 selects one of the three arms in steps S3 to S5 and trials a candidate value of the parameter defined by the selected arm.

When the arm of step S3 is selected in step S2, in step S3, the parameter searching unit 23 of the parameter tuning apparatus 1 transmits dummy requests (test data) to the computer system for a predetermined period of time at N−n QPS (Query Per Second).

When the arm of step S4 is selected in step S2, in step S4, the parameter searching unit 23 of the parameter tuning apparatus 1 transmits dummy requests to the computer system for a predetermined period of time at N QPS.

When the arm of step S5 is selected in step S2, in step S5, the parameter searching unit 23 of the parameter tuning apparatus 1 transmits dummy requests to the computer system for a predetermined period of time at N+n QPS. Here, N is a fixed value denoting the dummy request transmission frequency, and n is a width thereof.

An initial value of the probability that the parameter searching unit 23 selects one arm from the three arms of steps S3 to S5 may be ⅓. In other words, the parameter searching unit 23 may select each arm of steps S3 to S5 with equal probability. Subsequently, the parameter searching unit 23 may change the selection probability of the arms of steps S3 to S5 based on the reward updated in step S8, which will be described later. Alternatively, the parameter searching unit 23 may change the selection probability of each arm according to the convergence of the optimal value of the parameter in the subsequent parameter applying phase in step S9.

In the respective arms of steps S3 to S5, a predetermined time interval for transmitting a dummy request to the computer system at respective frequencies of N−n QPS, N QPS and N+n QPS may be, for example, several tens of seconds to several minutes. Alternatively, in the respective arms of steps S3 to S5, a dummy request may be transmitted to the computer system a predetermined number of times, for example, several tens to several hundreds of times, at respective frequencies.

In step S6, the parameter searching unit 23 of the parameter tuning apparatus 1 calculates, as the performance index, the reward obtained as a result of the trial of each arm of steps S3 to S5. More particularly, the parameter searching unit 23 measures the response time for each dummy request transmitted to the computer system when the dummy request is transmitted to the computer system at each frequency of N−n QPS, N QPS and the N+n QPS specified by each arm of steps S3 to S5.

The parameter searching unit 23 may calculate the average value of the response times of the dummy requests transmitted for a predetermined period of time or a predetermined number of times as the performance index. Alternatively, the parameter searching unit 23 may calculate a ratio of dummy requests of which response time is equal to or less than a predetermined threshold value (e.g., several hundred ms) with respect to the total number of requests.

In the reward calculation in step S6, in evaluating the response time when dummy requests, as the parameter indices, are transmitted to the computer system for a predetermined period of time or a predetermined number of times at respective frequencies of N−n QPS, N QPS and N+n QPS, the parameter searching unit 23 may evaluate the i-th trial using the evaluation function E(i) shown in the following Equation 1.

$$E(i) = e^{-count(t>T)} \quad \text{(Equation 1)}$$

Wherein, T is the allowable upper limit value of the response time, for example, 500 msec, and t is a measurement value of the response time. The evaluation function shown in the above Equation 1 counts the number of times that the response time t exceeds the allowable upper limit value T of the response time.

Alternatively, the parameter searching unit 23 may evaluate the i-th trial using the evaluation function E(i) shown in Equation 2 below. The evaluation function shown in Equation 2 accumulates the maximum difference between the allowable upper limit value T of the response time and the response time t.

$$E(i) = e^{-\Sigma max(0, t-T)} \quad \text{(Equation 2)}$$

According to the present embodiment, the evaluation function for calculating the reward that can be used by the parameter searching unit 23 is not limited to the above. For example, the parameter searching unit 23 may calculate an average value, a weighted average value, a moving average value, or the like of the response time to evaluate the response time.

In step S7, the controller unit 25 of the parameter tuning apparatus 1 determines whether or not the termination criterion of the arm trial has been cleared. The termination criteria of the arm trial may be arbitrary, and may include, for example, that the arm trial has been repeated a predetermined number of times or more (e.g., 1000 times), that the arm trial has been repeated for a predetermined period of time (e.g., several minutes to several tens of minutes), that a reward equal to or more than a predetermined criterion has been obtained, and the like.

When the termination criterion of the arm trial is cleared (step S7:Yes), the processing proceeds to step S9, while when the termination criterion of the arm trial is not cleared (step S7:N), the processing proceeds to step S8.

In step S5, the controller unit 25 of the parameter tuning apparatus 1 updates the reward of each parameter index (e.g., response time) corresponding to each arm of steps S3 to S5 selected in immediately preceding step S2. Subsequently, the controller unit 25 returns to step S2, and causes the parameter searching unit 23 to repeatedly perform the selection and trial of the arm, the calculation of the reward, and the like until the termination criterion is cleared. As described above, the parameter searching unit 23 may change the selection probability of the arms of steps S3 to S5 based on the reward updated in the immediately preceding step S8. In other words, the parameter searching unit 23 may select, in step S2, the arm that corresponds to the higher reward previously updated with a higher probability.

In step S9, the parameter applying unit 24 of the parameter tuning apparatus 1 selects, as the best candidate value of the parameter, the candidate value of the parameter for which the maximum reward is calculated from among the arms of steps S3 to S5 when the termination criterion is cleared in step S7, and then applies the best candidate value selected of the parameter to the computer system for a predetermined period of time. Here, the candidate value of the parameter, which is the selected best arm, is N' QPS. In other words, N' QPS is the value of the parameter for which the maximum reward, i.e., the minimum response time, has been calculated from among the arms of steps S3 to S5.

It should be noted that, in step S9, the predetermined period of time for which the parameter applying unit 24 applies the best candidate value of the parameter to the computer system may be, for example, several minutes to several hours, and may be longer than the predetermined period of time for which the arm is trialed in steps S3 to S5.

Applying the best parameter values to the computer system longer than the time the arm is trialed increases the probability that a greater reward can be achieved within a shorter time.

In step S10, the controller unit 25 of the parameter tuning apparatus 1 updates N QPS in the arms in steps S3 to S5 to N' QPS, and causes the parameter setting unit 22 to change the arm to be trialed by the Bandit algorithm. More particularly, the controller unit 25 updates N QPS in the arms in steps S3 to S5 to N' QPS, which is the best candidate value of the parameter for which the maximum reward has been calculated in step S6, and causes the parameter setting unit 22 to set N'-n QPS, N' QPS, and N'+n QPS as arms, respectively. In other words, the controller unit 25 sets candidate values of the parameter above and below the N' QPS to the arm group to be trialed next time such that the candidate value of the parameter N' QPS for which the maximum reward has been calculated becomes the center or the vicinity of the center in the arm group. It makes it possible to optimize the search range by arm trials.

For example, it is assumed that, when the candidate values of the parameter of {3, 5, 7} QPS are set as a group of three arms, the candidate value of the parameter for which the maximum reward is calculated is determined to be 7 QPS. In this case, the candidate values of the parameter of {5, 7, 9} QPS may be set to the arm group to be trialed next time such that 7 QPS becomes the center in the arm group.

Furthermore, it is assumed that, when the candidate values of the parameter of {3, 5, 7, 9} QPS are set as a group of four arms, the candidate value of the parameter for which the maximum reward is calculated is determined to be 7 QPS. In this case, the candidate values of the parameter of the immediately preceding {3, 5, 7, 9} QPS may be used as it is as the arm group to be trialed next time, or alternatively the candidate values of the parameter of {5, 7, 9, 11} QPS may be newly set to the arm group to be trialed next time.

It should be noted that, although a non-limiting example has been described in which the candidate values of the parameter of the upper and lower sides in the arm group are respectively set to the arm group to be trialed next time such that the candidate value of the parameter for which the maximum reward is calculated becomes the center or the vicinity of the center in the arm group, the present embodiment is not limited to those examples. For example, it may suffice that the candidate value of the parameter for which the maximum reward is calculated is at least included in the arm group.

For example, it is assumed that, when the candidate values of the parameter of {3, 5, 7} QPS are set to the arm group of three arms, the candidate value of the parameter for which the maximum reward is calculated is determined to be 7 QPS. In this case, the candidate values of the parameter of the immediately preceding {3, 5, 7} QPS, which already includes the candidate value of the parameter of 7 QPS for which the maximum reward is calculated, may be used without change as the arm group to be trialed next time. It makes it possible to prevent the increase in the number of dummy requests during the search from incurring a higher load on the computer system.

Furthermore, it is assumed that, when the candidate values of the parameter of {5, 7} QPS are set to the arm group of two arms, the candidate value of the parameter for which the maximum reward is calculated is determined to be 7 QPS. In this case, the candidate values of the immediately preceding {5, 7} QPS may be used without change as the arm group to be trialed next time, or alternatively the candidate values of the parameter of {7, 9} QPS may be newly set to the arm group to be trialed next time.

In addition, the arm selection probability and the reward calculation method may be changed in steps S3 to S5 at regular intervals.

Yet in addition, the controller unit 25 may repeatedly perform the processing of steps S1 to S10 on a continuous basis while the computer system to which the parameter to be tuned is applied is in operation, except when the stop is instructed. As a result, it makes it possible to change the optimal value of the parameter in accordance with the state change of the computer system which changes from time to time.

Figure 5:
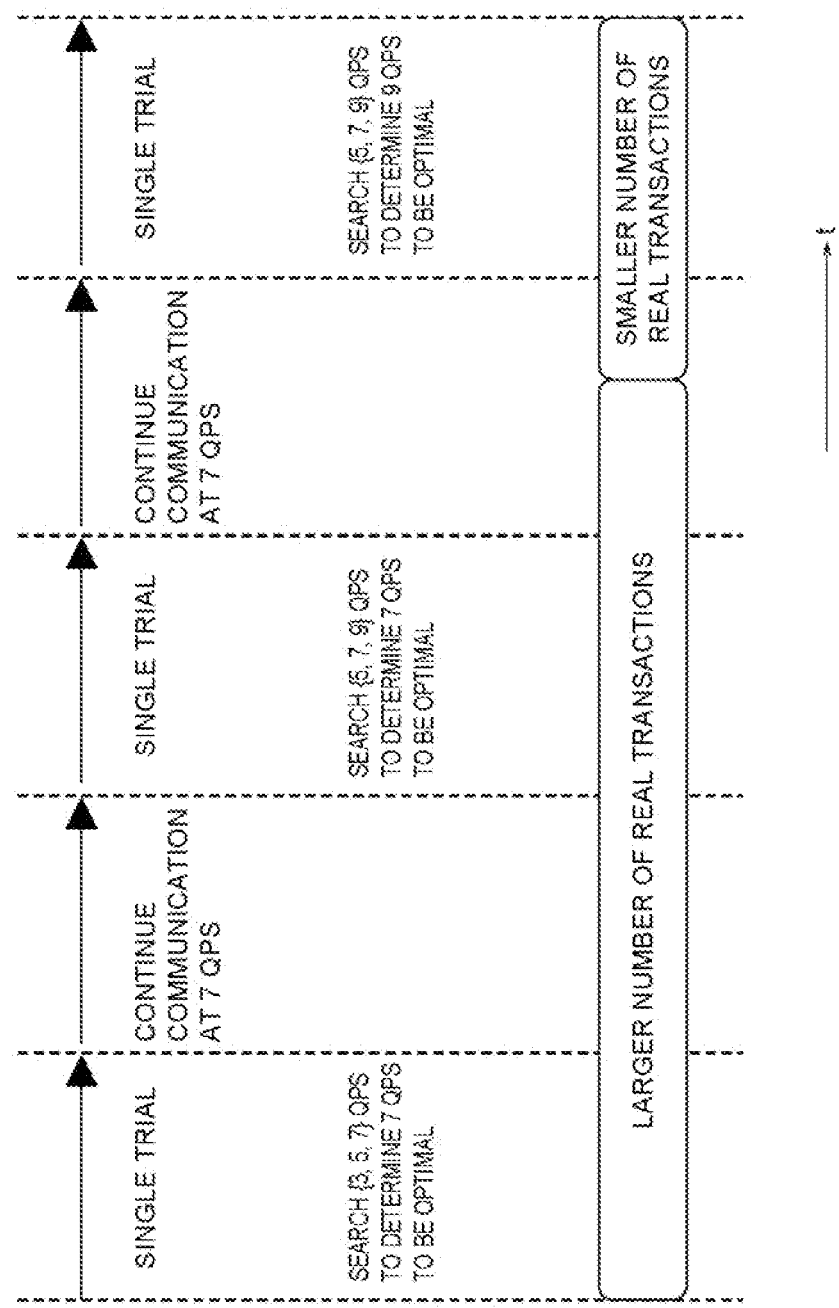
FIG. 5 is a schematic diagram illustrating that an optimal value of the parameter transitions in time series by performing the parameter tuning processing shown in FIG. 4.

FIG. 5 is a schematic diagram illustrating that the optimal value of the parameter transitions in time series by performing the parameter tuning processing shown in FIG. 4. In FIG. 5, the number of dummy requests to be input in addition to requests for real transactions is set to a parameter to be tuned, which are transmitted to maintain communication between the client terminal 31 and the replica servers 33a to 33n shown in FIG. 3 and communication sessions between the microservices within each replica server 33a to 33n shown in FIG. 3 without interruption.

Referring to FIG. 5 from the left, in single trial (i.e., steps S1 to S8 in FIG. 4) by the parameter searching unit 23 of the parameter tuning apparatus 1, first, {3, 5, 7} QPS is set to three arms, and each arm is trialed a predetermined number of times or for a predetermined period of time, and reward is calculated, so as to search for an optimal solution in a current trial.

In this single trial, it is assumed that 7 QPS is determined to be the optimal solution in a state having a larger number of real transactions actually input into the computer system per unit time.

Subsequently, the parameter applying unit 24 inputs dummy requests to the computer system at the frequency of 7 QPS, which is determined to be the optimal solution in the current trial. It makes it possible to maintain the communication sessions most efficiently. The controller unit 25 causes the parameter setting unit 22 to update the initial value of N (N=5) to 7 QPS, which is determined to be the optimal solution, setting to N=7. In FIG. 5, the width n is 2 QPS.

In the next single trial, {5, 7, 9} QPS is set to three arms, and each arm is trialed a predetermined number of times or for a predetermined period time, and the reward is calculated, so as to search for an optimal solution in a current trial.

In this single trial, similarly to the previous trial, it is assumed that 7 QPS is determined again to be the optimal solution in a state having a larger number of real transactions actually input into the computer system per unit time.

Subsequently, the parameter applying unit 24 inputs dummy requests to the computer system at the frequency of 7 QPS, which is determined to be the optimal solution in the current trial. It makes it possible to maintain the communication sessions most efficiently. In this case, since N=N'=7, the current value of N is not updated and the candidate values of the parameter of the arms are not changed as well.

Here, it is assumed that the number of real transactions actually input into the computer system is reduced over time as shown in FIG. 5, and it has transitioned to a state having a smaller number of real transactions actually input into the computer system per unit time.

In further next single trial, {5, 7, 9} QPS is set to three arms, and each arm is trialed a predetermined number of times or for a predetermined period time, and the reward is calculated, so as to search for an optimal solution in a current trial.

In this single trial, it is assumed that 9 QPS is determined to be the optimal solution in the state having a smaller number of real transactions actually input into the computer system per unit time. As the number of real transactions actually input into the computer system has been reduced, the optimal number of dummy requests, which complement the real transaction entry and contribute to maintaining the communication sessions of the computer system, will increase conversely.

Thereafter, the parameter applying unit 24 inputs dummy requests to the computer system at the frequency of 9 QPS, which is determined to be the optimal solution in the current trial. It makes it possible to maintain the communication sessions most efficiently. The controller unit 25 causes the parameter setting unit 22 to update the initial value of N (N=7) to 9 QPS, which is determined to be the optimal solution, setting to N=9.

In this way, the parameter tuning apparatus 1 according to the present embodiment follows the operating state including the communication state and the load state of the computer system, which changes from time to time, and continues the tuning operation of the parameter to be tuned at least during the operation of the computer system.

As described above, according to the present embodiment, the parameter tuning apparatus sets a plurality of candidates (arms) of a parameter from among a plurality of parameters tunable in the system, trials each of the set plurality of candidates of the parameter for a predetermined period of time or a predetermined number of times with respect to the computer system, and calculates rewards (performance indices) in the computer system, respectively. When it is determined that the predetermined termination criteria is satisfied, the parameter tuning apparatus further selects a candidate of the parameter for which the maximum (highest) reward is calculated from among the plurality of candidates of the parameter, applies the selected candidate of the parameter to the computer system, re-sets a plurality of candidates of the parameter such that the re-set candidates include the selected candidate of the parameter and both candidates of the parameter having values above and below the selected candidate of the parameter, and repeats the trial and applying processing with the plurality of re-set candidates of the parameter.

Accordingly, it makes it possible to autonomously and dynamically tune a parameter related to the performance of a computer system.

As a result, it makes it possible to reduce the selection of the candidate values of the parameter that deteriorates the performance of the computer system, so that it makes it possible to optimize the tuning of the computer system following the operation of the computer system which changes from time to time by searching for a parameter serving as the optimal solution more quickly and applying it to the computer system.

Second Embodiment

Hereinafter, with reference to FIG. 6, a second embodiment will be described in detail only with respect to matters different from the first embodiment.

In the first embodiment described above, a fixed width is employed for the width of the candidate values of the parameter between a plurality of options (arms) to be trialed by the parameter tuning apparatus 1. In contrast, according to the second embodiment, the width of the candidate values of the parameter between a plurality of options changes dynamically.

Since the hardware and functional configuration of the parameter tuning apparatus 1 according to the second embodiment are the same as those of the parameter tuning apparatus according to the first embodiment described with reference to FIGS. 1 and 2, the description thereof will be omitted.

Figure 6:
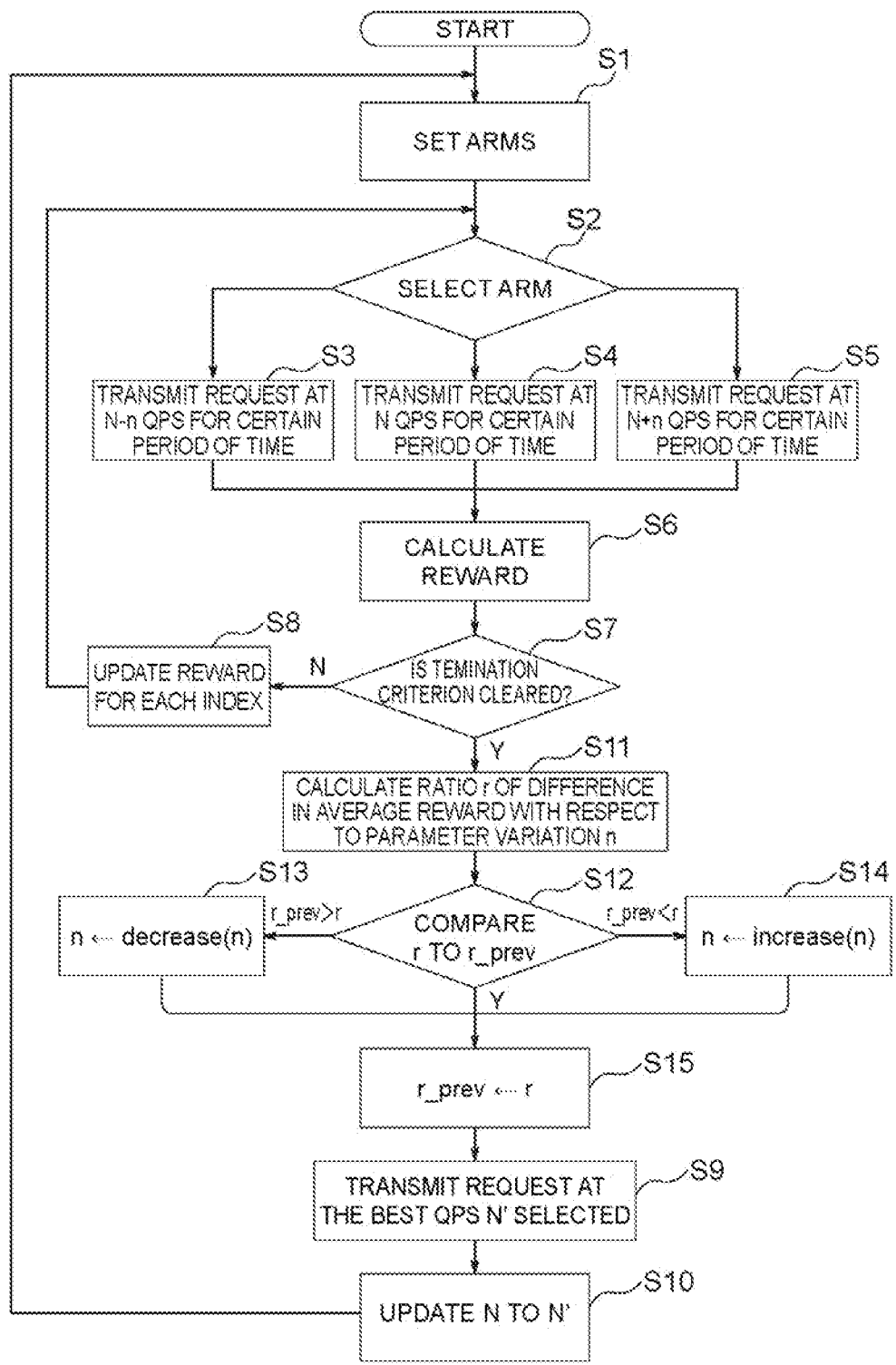
FIG. 6 is a flowchart showing an exemplary processing procedure of a parameter tuning process performed by the parameter tuning apparatus according to a second embodiment.

FIG. 6 is a flowchart illustrating an exemplary processing procedure of a parameter tuning processing performed by the parameter tuning apparatus 1 according to the second embodiment.

Referring to the flowchart of FIG. 6, the processing of steps S11 to S15 is added between steps S7 and S9 with respect to the parameter tuning processing performed by the parameter tuning apparatus 1 according to the first embodiment shown in FIG. 4.

The processing of steps S1 to S7 is the same as that of the first embodiment shown in FIG. 4. In other words, similarly to the first embodiment, the width n of the parameter values between the arms is set to a fixed width, and each arm is trialed with the set fixed width.

When it is determined in step S7 that the termination criterion of the trials of the three arms has been cleared (step S7:Y), in steps S11 to S15, the controller unit 25 of the parameter tuning apparatus 1 determines whether or not to change the width n, which is the amount of change (variation) in the parameter value between the arms, and, when changing the width n, determines whether or not to increase or decrease the width n.

More particularly, in step S11, the controller unit 25 calculates the average of the rewards R accumulated in the trials of each arm repeated up to the termination criterion, and calculates the ratio r of the difference between the arms in the calculated reward averages with respect to the current width n.

In step S12, the controller unit 25 of the parameter tuning apparatus 1 compares the ratio r calculated in step S11 with the ratio r_prev calculated previous time.

When the ratio r_prev calculated previous time is equal to the ratio r calculated in step S11, the processing proceeds to step S15. On the other hand, when the ratio r calculated in step S11 is smaller than the ratio r_prev calculated previous time, the processing proceeds to step S13, and the controller unit 25 decreases the width n and proceeds to step S15. On the other hand, when the ratio r calculated in step S11 is larger than the ratio r_prev calculated in the previous time, the processing proceeds to step S13, and the controller unit 25 increases the width n and proceeds to step S15.

In step S15, the controller unit 25 of the parameter tuning apparatus 1 substitutes the ratio r calculated in step S11 into the ratio r_prev calculated previous time. The subsequent processing in steps S9 to S10 is the same as that of the first embodiment shown in FIG. 4. In step S9, the parameter applying unit 24 of the parameter tuning apparatus 1 applies the candidate value of the parameter N' QPS that has the largest reward and is therefore evaluated as the optimal value in the current trial to the computer system. Subsequently, in step S10, the controller unit 25 updates N to the candidate value of the parameter N' which is evaluated as the optimal value and applied to the computer system in step S9, and repeats the parameter tuning processing shown in FIG. 6.

As described above, according to the second embodiment, the parameter tuning apparatus 1 calculates the ratio of the difference in the rewards between the arms with respect to the width n between the arms in the trial, and changes the width n such that the width n becomes smaller in the subsequent trial when the difference becomes smaller than in the previous trial, and the width n becomes larger in the subsequent trial when the difference becomes larger than in the previous trial.

When the difference becomes smaller than that of the previous trial, it can be assumed that the calculated reward does not change much even if the parameter value changes. For this reason, the parameter tuning apparatus 1 localizes the range of the search by reducing the width of the candidate values of the parameter between the arms. On the other hand, when the difference becomes larger than that of the previous trial, it can be assumed that the calculated reward changes significantly when the parameter value changes. For this reason, the parameter tuning apparatus 1 globalizes the range of the search by increasing the width of the candidate values of the parameter between the arms.

As a result, it makes it possible to optimize the search range by limiting the search direction in the trial among the population of candidate values of the parameter which can be taken in the computer system.

Third Embodiment

Hereinafter, with reference to FIG. 7, a third embodiment will be described in detail only with respect to matters different from the above embodiments.

In the embodiments described above, the processing of trial and applying of one parameter to be tuned has been repeated. In contrast, according to the third embodiment, a plurality of parameters that mutually relate to one another are tuned within the same parameter tuning processing.

Since the hardware and functional configuration of the parameter tuning apparatus 1 according to the third embodiment are the same as those of the parameter tuning apparatus according to the first embodiment described with reference to FIGS. 1 and 2, the description thereof will be omitted.

Figure 7:
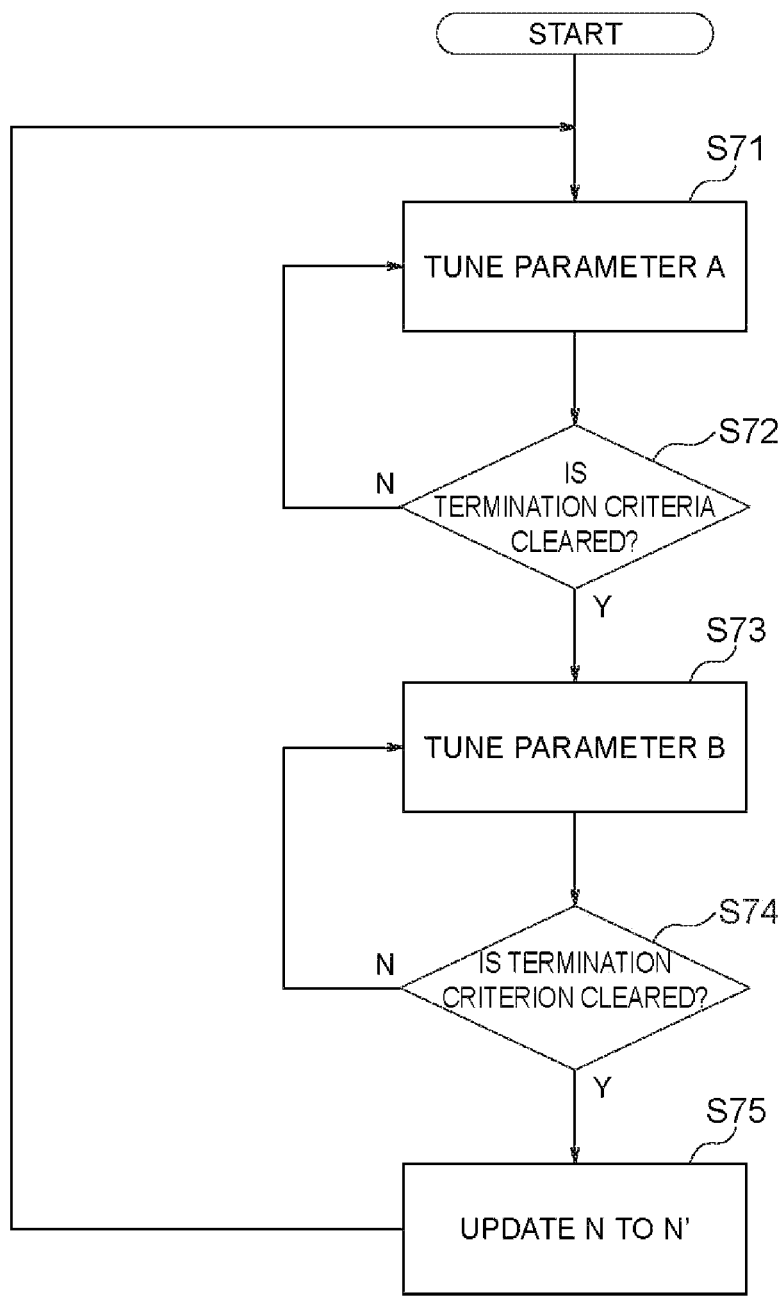
FIG. 7 is a flowchart showing an exemplary processing procedure of a parameter tuning process performed by the parameter tuning apparatus according to a third embodiment.

FIG. 7 is a flowchart illustrating an exemplary processing procedure of a parameter tuning processing performed by the parameter tuning apparatus 1 according to the third embodiment.

In step S71, the parameter tuning apparatus 1 tunes a parameter A among a plurality of mutually related parameters A and B. In step S71, the parameter tuning apparatus 1 may perform the same trial and applying processing as in steps S1 to S9 shown in FIG. 4 with respect to the parameter A.

In step S72, the parameter tuning apparatus 1 determines whether or not the termination criterion for tuning the parameter A is cleared. While the termination criterion for the parameter A has not been cleared (step S72:N), the processing returns to step S71, and the parameter tuning apparatus 1 repeats the tuning processing for the parameter A. On the other hand, when the termination criterion for the parameter A is cleared (step S72:Yh the processing proceeds to step S73.

In step S73, the parameter tuning apparatus 1 tunes the parameter B. In step S73, the parameter tuning apparatus 1 may perform the same trial and applying processing as in steps S1 to S9 shown in FIG. 4 with respect to parameter B.

In step S74, the parameter tuning apparatus 1 determines whether or not the termination criterion for tuning the parameter B is cleared. While the termination criterion for the parameter B has not been cleared (step S74:N), the processing returns to step S73, and the parameter tuning apparatus 1 repeats the tuning processing for the parameter B. On the other hand, when the termination criterion for the parameter B is cleared (step S74:Y), the processing proceeds to step S75.

In step S75, the parameter tuning apparatus 1 updates N to the candidate value of the parameter N' of the arm for which the highest reward has been calculated for the parameter A and the parameter B, respectively, and returns to step S71 to repeat the processing of steps S71 to S75.

Tuning a plurality of mutually related parameters requires a certain amount of time. For this reason, it is preferable to apply the present embodiment to parameters of which parameter values are not normally changed at a high frequency, for example, on a daily basis, such as the tuning of a plurality of DB parameters.

As such, when applying the present embodiment to parameters to be tuned over a long period of time, there is little restriction on the time by when the tuning is to be finished. For this reason, the amount of reward or a certain performance index may be set to the termination criteria in steps S72 and S74 in place of the time and the number of times.

As shown in FIG. 7, by alternately tuning the plurality of parameters mutually related to each other, although a globally optimal solution is not necessarily obtainable, it makes it possible to obtain at least locally optimal solutions with respect to both parameters.

It should be noted that, in the parameter tuning processing of a plurality of parameters shown in FIG. 7, the width between a plurality of arms may be dynamically changed, similarly to the second embodiment.

As described above, according to the present embodiment, it makes it possible to tune a plurality of mutually related parameters in parallel.

Modifications to Embodiments

While certain embodiments of the present invention have been described in detail above, the present invention is not limited to the above embodiments, and various modifications can be made.

As one modification, during a trial of a plurality of arms, for example at random, a parameter value distant from the set arm may be searched. In this case, taking as an example the parameter for which the number of dummy requests is to be tuned as described above, a search for parameter values (e.g., 10 QPS) that are distant in the direction larger than the present number of dummy requests (e.g., S QPS) may result in higher loads on the computer system. For this reason, it is preferable to search only for parameter values (e.g., 1 QPS) that are distant in the direction smaller than the present number of dummy requests. Accordingly, it makes it possible to effectively prevent convergence to the locally optimal solution while reducing the excessive load being incurred on the computer system.

As another modification, the type of a parameter to be tuned or the type of the reward for evaluating the parameter may be arbitrarily changed.

For example, the number of replica servers providing services in the network may be tuned in order to prevent the occurrence of a response with a response time T that exceeds a certain period of time.

Referring back to FIG. 3, a certain case is assumed where the number of replica servers 33a, 33b, . . . 33n is to be tuned. A request (e.g., an online payment transaction) is transmitted from the client terminal 31 to the n, n−1, and n+1 replica servers through the load balancer 32, for example, 100 times, and the response times t1, t2, and t3 are measured, respectively.

Usually, as the number of requests per unit time increases, the amount of communication increases, so that the number of replica servers increases. However, when the number of requests subsequently decreases, if the number of replica servers is maintained, the additional load is incurred by disconnecting and reconnecting the communication session due to the time-out so as to deteriorate the responses.

According to the present modification, similarly to the above embodiments, the number n of replica servers that minimizes the response time t can be tuned dynamically and autonomously using the Bandit algorithm. In order to evaluate the response time t, any evaluation function described above can be used.

As a modification of the type of reward, the consumption amount of the CPU or the memory may be evaluated instead of the number or the ratio of times that the average value or the upper limit value of the response time is exceeded. For example, when tuning the number of dummy requests, the maximum reward may be calculated for the arm that consumes the minimum amount of CPU and memory.

As a modification of the type of parameter, parameters of the DB (database), parameters of the CPU or memory to be allocated to a certain service, parameters for communication, and the like may be tuned. For example, as a parameter of the DB, in order to maximize the response of the DB, the key buffer size of the DB or the like may be tuned by calculating the average response time as a reward. As another parameter of the DB, in order to maximize the cache hit rate without consuming wasteful memory, the cache size or the cache location of the DB may be tuned by calculating the cache hit rate as a reward.

Furthermore, for example, as a parameter of the CPU or memory, in order to improve the throughput in the most cost-effective way, the number of CPU may be tuned by calculating the number or amount of throughput per CPU cost as a reward.

Yet furthermore, for example, as a communication parameter, in order to reduce the communication load and shorten the response time, the average response time may be calculated as a reward, thereby tuning the time for maintaining the communication session or connection (i.e., time-out period).

As yet another modification, the number of arms to be trialed may be changed to any number other than three. In this case, the number of arms may be appropriately selected based on the total number of parameter values that the parameter to be tuned can theoretically or practically take.

Although specific embodiments have been described above, the embodiments described are illustrative only and are not intended to limit the scope of the present invention. The apparatus and method described herein may be embodied in other forms than as described above. In addition, it is also possible to appropriately omit, substitute, or modify the above described embodiments without departing from the scope of the present invention. Embodiments with such omissions, substitutions and modifications fall within the scope of the appended claims and equivalents thereof and also fall within the technical scope of the present invention.

REFERENCE SIGNS LIST

1: Parameter Tuning Apparatus; 11: CPU; 12: ROM; 13: RAM; 14: HDD; 15: Input Unit; 16: Display Unit; 17: Communication I/F; 21: Data Input Unit; 22: Parameter Setting Unit; 23: Parameter Searching Unit; 24: Parameter Applying Unit; 25: Controller Unit; 26: Communication Unit; 31: Client Terminal; 32: Load Balancer; 33a to 33n: Replica Servers

What is claimed is:

1. An information processing apparatus, comprising:
   at least one memory configured to store program code; and
   electronic circuitry including at least one of a field programmable gate array (FPGA), an application specific integrated circuit (ASIC), and at least one processor, the at least one processor being configured to read and operate according to the program code, the electronic circuitry configured to:
   set a plurality of candidate values of a parameter tunable in a computer system;
   trial each of the plurality of set candidate values of the parameter with respect to the computer system for a predetermined period of time or a predetermined number of times and calculate a reward in the computer system;
   select, when a trial satisfies a predetermined termination criterion, a candidate value of the parameter for which a maximum reward is calculated among the candidate values of the parameter and apply the selected candidate value of the parameter with respect to the computer system; and
   re-set a plurality of candidate values of the parameter based on the selected candidate value of the parameter and repeat processing of setting the parameter, trialing of the parameter, calculating the reward, selecting the candidate value, and applying the parameter with the plurality of re-set candidate values of the parameter.

2. The information processing apparatus according to claim 1, wherein the electronic circuitry is further configured to:
   re-set the plurality of candidate values of the parameter so as to include the selected candidate value of the parameter and candidate values of the parameter above and below the selected candidate value of the parameter.

3. The information processing apparatus according to claim 1, wherein the electronic circuitry is further configured to:
   repeat the processing of the setting the parameter, the trial of the parameter, the calculating the reward, the selecting the candidate value, and the applying the parameter while the computer system is in operation.

4. The information processing apparatus according to claim 1, wherein the electronic circuitry is further configured to:
   re-set the plurality of candidate values of the parameter such that the selected candidate value of the parameter become a center or a vicinity of the center among the plurality of candidate values of the parameter in the subsequent trial.

5. The information processing apparatus according to claim 1, wherein the electronic circuitry is further configured to:
   terminate a trial when the trial is performed for a fixed period of time or a fixed number of times, or when a predetermined reward is accumulated, and
   select the candidate value of the parameter for which the maximum reward is calculated at an end of the trial and apply the selected candidate value of the parameter to the computer system.

6. The information processing apparatus according to claim 1, wherein the electronic circuitry is further configured to:
   dynamically change a width between a plurality of candidate values of the parameter to be re-set and re-set the plurality of candidate values of the parameter.

7. The information processing apparatus according to claim 6, wherein the electronic circuitry is further configured to:
   dynamically change the width to be smaller when a rate of a difference in the reward between a plurality of candidate values of the parameter with respect to the width is smaller than the rate in the previous trial, and to be larger when the rate is greater than the rate in the previous trial.

8. The information processing apparatus according to claim 1, wherein the electronic circuitry is further configured to:
   tune a first parameter among a plurality of parameters mutually related by repeating the processing of the setting the first parameter, the trial of the first parameter, the calculating the reward, the selecting the candidate value, and the applying the first parameter, subsequently tune a second parameter among the plurality of parameters by repeating the processing of the setting of the second parameter, the trial of the second parameter, the calculating the reward, the selecting the candidate value, and the applying the second parameter, and repeat tuning of the first parameter and the second parameter.

9. The information processing apparatus according to claim 1, wherein the electronic circuitry is further configured to:
   set a randomly selected candidate value of the parameter, the randomly selected candidate value being different from the plurality of candidate values of the parameter already set.

10. The information processing apparatus according to claim 9, wherein the electronic circuitry is further configured to:
    randomly select a value smaller than any of the plurality of candidate values of the parameter already set.

11. The information processing apparatus according to claim 1, wherein the electronic circuitry is further configured to:
    repeat applying the selected candidate value of the parameter to the computer system for a period of time or a number of times that is greater than the predetermined period of time or the predetermined number of times in which each of the plurality of candidate values of the parameter has been trialed.

12. An information processing method executed by an information processing apparatus comprising at least one memory configured to store program code, and electronic circuitry including at least one of a field programmable gate array (FPGA), an application specific integrated circuit (ASIC), and at least one processor, the at least one processor being configured to read and operate according to the program code, the information processing method comprising:
    setting a plurality of candidate values of a parameter tunable in a computer system;
    trialing each of the set plurality of candidate values of the parameter with respect to the computer system for a predetermined period of time or a predetermined number of times and calculating a reward in the computer system;
    selecting, when a trial satisfies a predetermined termination criterion, a candidate value of the parameter for which a maximum reward is calculated among the candidate values of the parameter and applying the selected candidate value of the parameter with respect to the computer system; and re-setting a plurality of candidate values of the parameter based on the selected candidate value of the parameter and repeating processing of the setting of the parameter, the trialing of the parameter, the calculating the reward, the selecting the candidate value, and the applying the parameter with the plurality of re-set candidate values of the parameter to the computer system.

13. A non-transitory computer readable medium storing thereon an information processing computer program that when executed by an information processing apparatus including at least one processor causes the at least one processor to:

set a plurality of candidate values of a parameter tunable in a computer system;

trial each of the plurality of candidate values of the parameter with respect to the computer system for a predetermined period of time or a predetermined number of times and calculate a reward in the computer system;

select, when a trial satisfies a predetermined termination criterion, a candidate value of the parameter for which a maximum reward is calculated among the candidate values of the parameter and apply the selected candidate value of the parameter with respect to the computer system; and re-set a plurality of candidate values of the parameter based on the selected candidate value of the parameter and repeat processing of setting the parameter, trialing the parameter, calculating the reward, selecting the candidate value, and applying the parameter with the plurality of re-set candidate values of the parameter to the computer system.

* * * * *